Dec. 9, 1924.
C. C. MOORE
PROCESS OF DRYING FRUIT
Filed Aug. 13, 1923
1,518,537
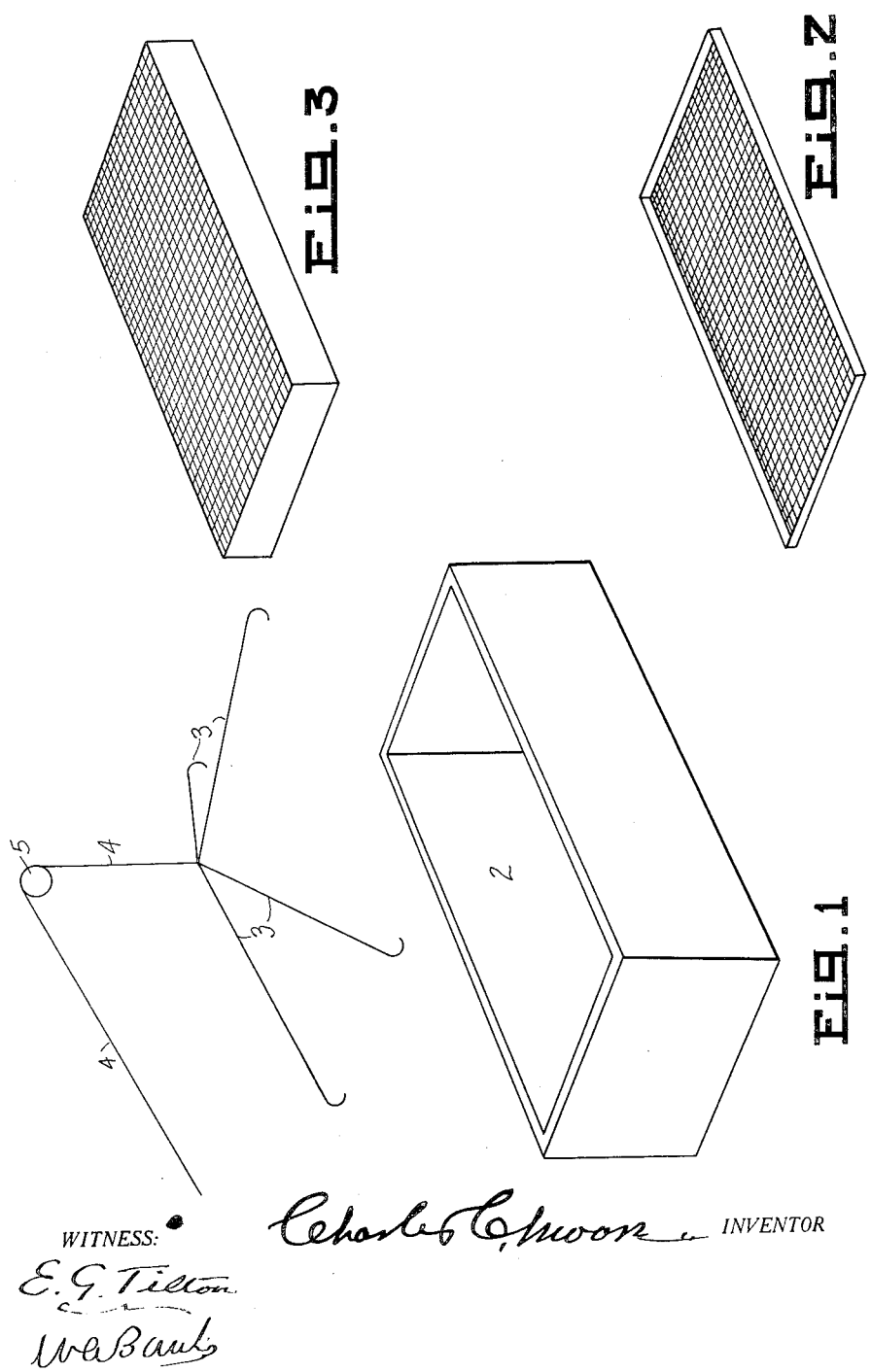

Patented Dec. 9, 1924.

1,518,537

UNITED STATES PATENT OFFICE.

CHARLES C. MOORE, OF SAN FRANCISCO, CALIFORNIA.

PROCESS OF DRYING FRUIT.

Application filed August 13, 1923. Serial No. 657,203.

*To all whom it may concern:*

Be it known that I, CHARLES C. MOORE, a citizen of the United States, residing at the city and county of San Francisco and State of California, have invented certain new and useful Improvements in Processes of Drying Fruit, of which the following is the specification.

In drying fruit, such as prunes, where the moisture of the fruit is to be exuded through the skin of the fruit, it is advantageous to treat the fruit with a chemical solution, such as a solution of caustic soda, for the purpose of rendering the skin of the fruit more pervious to its moisture content during the time the fruit is being subjected to a drying process. The advantage of such treatment before subjecting such a fruit as prunes to a drying process is well known, and generally practiced, and commonly described as "checking" the fruit. The common practice is to place the fruit in a container suitable to hold it while the container and its fruit is immersed in a solution of caustic soda for the required interval of time, then transfer the fruit from the said container to another container suitable for holding the fruit while it is being subjected to a drying process. This procedure calls for a double handling of the fruit at a time when its skin is more susceptible to injury.

To simplify the handling of the fruit and to obviate injury to its skin when the skin is more susceptible to injury through transference from one container to another, I have devised means for using the same container for both purposes. This is accomplished by using a container of a shape and size suitable for holding the fruit while it is being subjected to a drying process, as a tray with wiremesh bottom, and a vat suitable for holding a solution of caustic soda into which the tray with its fruit content can be immersed for the required interval of time to "check" the fruit, and then subjecting the same tray and its fruit content to a drying process. As is obvious, there would be required a number of such trays, in general practice, each tray being filled with fruit, then immersed in the vat of caustic soda solution, then passed on to the means that may be provided for drying the fruit.

In addition to the advantage mentioned, my procedure has the further advantage of distributing the fruit over the tray. When fruit is being dried in trays, it is advantageous to have the fruit spread as evenly as practicable over the tray. In common practice the procedure is to spread the fruit evenly by means of one's hand, or by mechanically shaking the tray to cause the fruit to spread over the tray. In my method of immersing the tray containing the fruit in a vat of caustic soda solution for the purpose of "checking" the fruit, such as prunes, where the specific gravity of the fruit does not greatly differ from that of water, the fruit has a tendency to float, especially, if the tray be immersed quickly. As a consequence, the fruit momentarily floats while the tray is lowered into the solution of caustic soda; and this floating causes it to spread in an even layer when it settles to the tray, or when the tray is raised to the floating fruit.

In instances where the length and breadth of the vat are but slightly larger than those of the tray, it is obvious that the fruit could not float beyond the borders of the tray. In instances where the vat is sufficiently large to permit the fruit to float beyond the borders of the tray, there is provided a cover device to permit the fruit to float but to prevent it floating beyond the borders of the tray. A practical design for such a cover device would be similar to an inverted wiremesh bottom tray where the sides and ends are of sufficient height such that when the cover device has been placed over the tray of fruit, and the tray immersed, the fruit will have ample space to float freely but not to get beyond the borders of the tray.

For a more specific description of my apparatus, I shall refer to the accompanying sheet of drawing where Fig. 1, shows a rectangular shaped vat, 2, for holding the chemical solution into which the fruit is to be immersed for the purpose of "checking" it; and the grapple device, 3, suspended by the rope, 4, which rope goes over the groove pulley, 5, the pulley being suspended to some fixture.

Fig. 2, is a rectangular shaped fruit tray with wire mesh bottom, suitable for holding fruit while it is being immersed in the chemical solution in vat, 2, and also suitable for holding the fruit while it is subsequently subjected to a drying process.

Fig. 3, is a rectangular shaped cover device, having sides and ends several inches in height to which is fixed a wire mesh, the rectangular dimensions of the cover device being practically the same as the rectangular dimensions of the tray in Fig. 2.

The proper quantity of fresh fruit, such as prunes, is put into the tray, and over the tray of fruit is placed the cover device, the wiremesh being upward. The tray is then moved near to the vat, 2, and by means of the rope, 4, the grapple device, 3, is lowered to let its arms engage the tray. By means of the rope, 4, the grapple device and tray is raised, and then lowered into the vat, 2, and after it has been immersed the required interval of time, it is raised from the vat by means of the same rope, 4.

If the sides and ends of the cover device are of sufficient height, it is obvious that a fruit, such as prunes, will float from the tray, but cannot get beyond the borders of the tray, and will settle evenly over the tray when it is raised from the vat. Or, if the vat be of a size to let the tray be immersed in it, but not large enough to let the fruit, such as prunes, float between the borders of the tray and the side walls of the vat, no cover device would be required.

After the tray of fruit has been immersed in the vat, and has been raised from it, and the cover device, if one is used, be removed, the tray of fruit is then ready to be subjected to any drying process, such as drying in the open air, or by artificial means for drying, such as a dehydrater.

Having thus fully described my invention, what I claim as new and desire to secure by Letters Patent of the United States, is:—

1. The process of making dried prunes which comprises placing the fresh prunes in a mesh-bottom tray, immersing the tray of prunes in an alkaline solution for the purpose of rendering the skin of the prune more pervious to its moisture, withdrawing the tray of prunes from the alkaline solution and subjecting the tray of prunes to a drying procedure for the purpose of making dried prunes.

2. The process of making dried prunes which comprises placing a sufficient quantity of fresh prunes in a mesh-bottom tray to spread one layer deep, immersing the tray of prunes in a liquid for the purpose of floating the prunes into an even layer over the tray, withdrawing the tray of prunes from the liquid and subjecting the tray of prunes to a drying procedure for the purpose of making dried prunes.

3. The process of making dried fruit which comprises placing the fresh fruit in a mesh-bottom tray, immersing the tray of fruit in an alkaline solution for the purpose of rendering the skin of the fruit more pervious to its moisture, withdrawing the tray of fruit from the alkaline solution and subjecting the tray of fruit to a drying procedure for the purpose of making dried fruit.

4. The process of making dried fruit which comprises placing a sufficient quantity of fresh fruit in a mesh-bottom tray to spread one layer deep, immersing the tray of fruit in a liquid for the purpose of floating the fruit into an even layer over the tray, withdrawing the tray of fruit from the liquid and subjecting the tray of fruit to a drying procedure for the purpose of making dried fruit.

5. The process of making dried fruit which comprises placing the fresh fruit in a tray, immersing the tray of fruit in a liquid for the purpose of floating the fruit into an even layer over the tray, withdrawing the tray of fruit from the liquid and subjecting the tray of fruit to a drying procedure for the purpose of making dried fruit.

In testimony whereof I have hereunto signed my name in the presence of two subscribing witnesses.

CHARLES C. MOORE.

Witnesses:
E. G. TILTON,
W. A. BANKS.